(12) United States Patent
Johnson et al.

(10) Patent No.: US 10,767,427 B2
(45) Date of Patent: Sep. 8, 2020

(54) CONTROL OF MANAGED PRESSURE DRILLING

(71) Applicant: SCHLUMBERGER TECHNOLOGY CORPORATION, Sugar Land, TX (US)

(72) Inventors: Ashley Bernard Johnson, Cambridge (GB); Maurice Ringer, Roissy-en-France (FR); Devi Putra, Cambridge (GB); Michalis Frangos, Cambridge (GB); Jakub Jerabek, Cambridge (GB); Kjetil Havre, Skedsmokorset (NO); Walter David Aldred, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 619 days.

(21) Appl. No.: 14/650,181

(22) PCT Filed: Dec. 5, 2013

(86) PCT No.: PCT/IB2013/060673
§ 371 (c)(1),
(2) Date: Jun. 5, 2015

(87) PCT Pub. No.: WO2014/087371
PCT Pub. Date: Jun. 12, 2014

(65) Prior Publication Data
US 2015/0308204 A1 Oct. 29, 2015

Related U.S. Application Data

(60) Provisional application No. 61/733,829, filed on Dec. 5, 2012.

(51) Int. Cl.
*E21B 21/08* (2006.01)
*E21B 47/00* (2012.01)
*G05B 13/04* (2006.01)

(52) U.S. Cl.
CPC .............. *E21B 21/08* (2013.01); *E21B 47/00* (2013.01); *G05B 13/048* (2013.01)

(58) Field of Classification Search
None
See application file for complete search history.

(56) References Cited

U.S. PATENT DOCUMENTS 8,170,801 B2 * 5/2012 Foot ........................ E21B 43/00
702/12
2004/0244972 A1 12/2004 Sayers et al.
(Continued)

FOREIGN PATENT DOCUMENTS

WO WO2010101473 A1 9/2010
WO WO2012027245 A1 3/2012

OTHER PUBLICATIONS

"Adaptive Observer Design for the Bottomhole Pressure of a Managed Pressure Drilling System" Proceedings of the 47th IEEE Conference on Decision and Control, Dec. 9-11, 2008, pp. 2961-2966 by Stamnes et al., (Year: 2008).*
(Continued)

*Primary Examiner* — Emilio J Saavedra

(57) ABSTRACT

A method is provided for controlling a managed pressure drilling system. The method comprises providing a fast system interpretation model for the operation of the managed pressure drilling system, obtaining real-time measurements from one or more sensors regarding the operation of the managed pressure drilling system, using the measurements to calibrate the fast system interpretation model for the managed pressure drilling system in real-time and using
(Continued)

a predictive controller to run the calibrated fast system interpretation model to a time horizon in the future.

20 Claims, 6 Drawing Sheets

(56) References Cited

U.S. PATENT DOCUMENTS

| | | | |
|---|---|---|---|
| 2006/0175090 A1 | 8/2006 | Reitsma et al. | |
| 2007/0168056 A1 | 7/2007 | Shayegi et al. | |
| 2007/0227774 A1 | 10/2007 | Reitsma et al. | |
| 2009/0157590 A1* | 6/2009 | Mijares | E21B 43/00 706/61 |
| 2009/0198350 A1* | 8/2009 | Thiele | G05B 13/042 700/30 |
| 2011/0042076 A1 | 2/2011 | Reitsma | |
| 2011/0139509 A1 | 6/2011 | Pool et al. | |
| 2011/0301436 A1* | 12/2011 | Teixeira | A61B 5/0402 600/301 |
| 2012/0059521 A1* | 3/2012 | Iversen | E21B 44/00 700/275 |
| 2012/0101787 A1* | 4/2012 | Zhou | E21B 43/00 703/2 |
| 2014/0122047 A1* | 5/2014 | Saldivar | E21B 44/00 703/10 |
| 2015/0226049 A1 | 8/2015 | Frangos et al. | |

OTHER PUBLICATIONS

"Drilling Automation: Presenting a Framework for Automated Operations" Society of Petroleum Engineers. SPE Drilling and Completion, Mar. 2012, pp. 118-126 by Breyholtz et al., (Year: 2012).*

Nygaard, "Nonlinear model predictive control scheme for stabilizing annulus pressure during oil well drilling Journal of Process Control" Issue 16, 2006 pp. 719-732 (Year: 2006).*

Nygaard, G. et al., "Nonlinear Model Predictive Control Scheme for Stabilizing Annulus Pressure During Oil Well Drilling", Journal of Process Control, 2006, 16(7), pp. 719-732.

International Search Report and Written Opinion of International Application No. PCT/IB2013/060673 dated Mar. 27, 2014, 13 pages.

Exam Report of corresponding European Application No. 13860716.3, dated Jul. 14, 2016, 5 pages.

Search Report of corresponding European Application No. 13860716.3 dated Jun. 29, 2016, 4 pages.

International Preliminary Report on Patentability of International Patent Application No. PCT/IB2013/060673, dated Jun. 18, 2015, 8 pages.

Maciejowski, J.M., Predictive control with constraints, Prentice Hall, ISBN: 978-0-201 3-9823-6, 2001, Chapters 2-8, 228 pages.

* cited by examiner

CONTROL OF MANAGED PRESSURE DRILLING

BACKGROUND

Embodiments of the present invention relate to control of managed pressure drilling systems, e.g. control of the hydraulics involved in managed pressure drilling, which system may be used in drilling a subterranean borehole, and particularly, but not exclusively, for the purpose of extracting hydrocarbons from a subterranean reservoir. The systems may use a single phase drilling fluid or may use multiple phases. The systems may be underbalanced. The systems may include produced formation fluids.

The drilling of a borehole is typically carried out using a steel pipe known as a drillstring with a drill bit coupled on the lower most end of the drillstring. The entire drillstring may be rotated using an over-ground drilling motor, or the drill bit may be rotated independently of the drillstring using a fluid powered motor or motors mounted in the drillstring just above the drill bit. As drilling progresses, a flow of drilling fluid is used to carry the debris created by the drilling process out of the borehole. The drilling fluid is pumped through an inlet line down the drillstring to pass through the drill bit, and returns to the surface via an annular space between the outer diameter of the drillstring and the borehole (generally referred to as the annulus or the drilling annulus).

Drilling fluid is a broad drilling term that may cover various different types of drilling fluids. The term "drilling fluid" may be used to describe any fluid or fluid mixture used during drilling and may cover such things as air, nitrogen, misted fluids in air or nitrogen, foamed fluids with air or nitrogen, aerated or nitrified fluids to heavily weighted mixtures of oil or water with solid particles.

The drilling fluid flow through the drillstring may be used to cool the drill bit. In conventional overbalanced drilling, the density of the drilling fluid is selected so that it produces a pressure at the bottom of the borehole (the "bottom hole pressure" or "BHP"), which is high enough to counter-balance the pressure of fluids in the formation (the "formation pore pressure"). By counter-balancing the pore pressure, the BHP acts to prevent the inflow of fluids from the formations surrounding the borehole. However, if the BHP falls below the formation pore pressure, formation fluids, such as gas, oil and/or water may enter the borehole and produce what is known in drilling as a kick. By contrast, if the BHP is very high, the BHP may be higher than the fracture strength of the formation surrounding the borehole resulting in fracturing of the formation. When the formation is fractured, the drilling fluid—which is circulated down the drillstring and through the borehole, for among other things, removing drilling cuttings from the bottom of the borehole—may enter the formation and be lost from the drilling process. This loss of drilling fluid from the drilling process may cause a reduction in BHP and as a consequence cause a kick as the BHP falls below the formation pore pressure.

In order to overcome the problems of kicks and/or fracturing of formations during drilling, a process known as managed pressure drilling ("MPD") has been developed. In MPD various techniques may be used to control the BHP during the drilling process. One such method comprises injecting gas into the drilling fluid/mud column in the drilling annulus (during the drilling process drilling fluid/mud is continuously circulated down the drillstring and back up through the annulus formed between the drillstring and the wall of the borehole being drilled and, as a result, during the drilling process a column of drilling fluid/mud is present in the annulus) to reduce the BHP produced by the column of the mud/drilling fluid in the drilling annulus. An MPD system using gas injection is illustrated in FIG. 1.

In MPD, the annulus may be closed using a pressure containment device. This device comprises sealing elements, which engage with the outside surface of the drillstring so that flow of fluid between the sealing elements and the drillstring is substantially prevented. The sealing elements may allow for rotation of the drillstring in the borehole so that the drill bit on the lower end of the drillstring may be rotated. A flow control device may be used to provide a flow path for the escape of drilling fluid from the annulus. After the flow control device, a pressure control manifold, with at least one adjustable choke, valve and/or the like, may be used to control the rate of flow of drilling fluid out of the annulus. When closed during drilling, the pressure containment device creates a backpressure in the borehole, and this back pressure can be controlled by using the adjustable choke or valve on the pressure control manifold to control the degree to which flow of drilling fluid out of the annulus/riser annulus is restricted.

During MPD an operator may monitor and compare the flow rate of drilling fluid into the drillstring with the flow rate of drilling fluid out of the annulus to detect if there has been a kick or if drilling fluid is being lost to the formation. A sudden increase in the volume or volume flow rate out of the annulus relative to the volume or volume flow rate into the drillstring may indicate that there has been a kick. By contrast, a sudden drop in the flow rate out of the annulus/ relative to the flow rate into the drillstring may indicate that the drilling fluid has penetrated the formation and is being lost to the formation during the drilling process.

In some MPD procedures, gas injection may be used to control the BHP. In such MPD procedures, gas may be pumped into the annulus between the drillstring and the borehole wall (this annulus may be referred to as the "drilling annulus") in order to reduce bottomhole-pressure while drilling. Often, the borehole is lined with a pipe that is referred to as a casing string that may be cemented to the borehole wall to, among other things, stabilize the borehole and allow for flow of drilling fluids, production of hydrocarbons from the borehole and/or the like. The drilling annulus may be formed by the annulus lying between the drillstring and the casing string.

Annular gas injection is an MPD process for reducing the BHP in a borehole. In many annular gas injection systems, in addition to lining the borehole with casing, a secondary annulus is created around the drilling annulus by placing an additional pipe around the casing for at least a section of the borehole. This secondary annulus may be connected by one or more orifices at one or more depths to the primary annulus, through which the drilling fluids flow. In this concentric casing type gas injection system, initiating the process of gas injection into the drilling annulus to reduce the BHP can be problematic as, among other things, injection of the gas into the borehole can produce large fluctuations in borehole pressure (the injected gas may create large, oscillating flow of the drilling fluid in the borehole) and achieving a steady-state in the borehole may take hours of unproductive time and/or require pumping large volumes of gas into the borehole. For example, if large gas injectors are used for gas injection, then large flows of drilling fluids may be produced between the gas injection pipe and the drilling annulus. Conversely, if small gas injectors are used, large pressures and gas volumes may be needed to force/inject the gas into the drilling annulus and these large pressures volumes may produce large oscillations in the pressure/flows in the drilling systems.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth.

In general terms, some embodiments of the present disclosure may provide for the use of a predictive controller for controlling a managed pressure drilling system. Use of such a controller can improve the control of such a system, particularly, but not by way of limitation, by reducing the effect of phase separation on BHP during shut-in.

In one embodiment, a method for controlling a managed pressure drilling system, is provided that comprises providing a fast system interpretation model for the operation of the managed pressure drilling system, obtaining real-time measurements from one or more sensors regarding the operation of the managed pressure drilling system and/or the properties of the environment the managed pressure drilling system is operating in, using the measurements to calibrate the fast system interpretation model for the managed pressure drilling system in real-time and using a predictive controller to run the calibrated fast system interpretation model to a time horizon in the future.

In another embodiment, a computer system is provided for performing the method of the first embodiment. For example, such a computer system may comprise a computer-readable medium or media storing a fast system interpretation model for the operation of the managed pressure drilling system; an interface for receiving in real-time measurements from one or more sensors, wherein the sensor measurements are measurements associated with the operation of the managed pressure drilling system; and one or more processors which: use the measurements to calibrate the fast system interpretation model for the managed pressure drilling system in real-time; and use a predictive controller to run the calibrated fast system interpretation model to a time horizon in the future. The storage and/or processing may be performed using non-transient storage/signals.

Further aspects of the present invention provide: a computer program comprising non-transient code which, when run on a computer, causes the computer to perform the method of the first embodiment; and a computer readable medium storing a computer program comprising code which, when run on a computer, causes the computer to perform the method of the first embodiment.

Another aspect of the present invention provides a managed pressure drilling system comprising one or more sensors, and a computer system, such as described in the second embodiment.

Optional features of the invention will now be set out. These are applicable singly or in any combination with the invention as described in general terms or with any aspect of the invention.

In some embodiments, the fast system interpretation model may run/updates faster than real-time. This allows the model to provide multiple predictions at any given time step of the controller, facilitating optimisation of operational parameters by the controller. For example, the fast system interpretation model may run/update in the region of 10 to 250 times faster than real-time.

The fast system interpretation model may comprise a hydraulic model of the managed pressure drilling system.

In some aspects, the fast system interpretation model may comprise uncertainties associated with one or more parameters. For example, the fast system interpretation model may provide a model of the managed pressure drilling system including approximations of the one or more parameters based upon the real-time measurements. The uncertainties associated with the parameters may be updated faster than real-time. The one or more uncertain parameters may comprise at least one of a pressure of a gas phase in the managed pressure drilling system, a pressure of a liquid phase in the managed pressure drilling system, a pressure of a drilling fluid in the managed pressure drilling system, and a distribution of different phases in the managed pressure drilling system.

Thus, the step of using the measurements to calibrate the fast system interpretation model may comprise comparing the measurements to one or more predicted parameters having an uncertainty and updating the fast system interpretation model based upon the comparison.

For example, a state of the managed pressure drilling system, such as the distribution of gas in the system, may be determined from the comparison.

Additionally or alternatively, the step of using the measurements to calibrate the fast system interpretation model for the managed pressure drilling system in real-time may comprise using the real-time measurements in the fast system interpretation model to predict one or more uncertain parameters.

The time horizon may comprise a fixed time period, a temporal occurrence of a predicted event and/or the like. By way of example, the predicted event may comprise exit of substantially all of a gas phase from a wellbore/borehole being drilled by the managed pressure drilling system.

In some embodiments of the present disclosure, the method may further comprise: generating an alarm when the fast system interpretation model indicates occurrence of a detrimental event prior to the time horizon if operation of the managed pressure drilling system is continued without modification.

The method may comprise: simultaneously using a plurality of predictive controllers to run the calibrated fast system interpretation model to respective and different time horizons in the future. For example, a primary predictive controller can be used to operate on a long time horizon (e.g. corresponding to the timescale to circulate fluid around the entire well, or a specific event such as exit of substantially all of a gas phase from a wellbore of the managed pressure drilling system), and a secondary predictive controller can be used to operate on a shorter time horizon (e.g. less than one second or less than the acoustic travel time round the well), to control events such as choke closure and pump shut off of the managed pressure drilling system.

Additionally, or alternatively, the method may further comprise: using one or more additional controllers to run the calibrated fast system interpretation model, the additional controllers not being predictive controllers. For example, the or each additional controllers can be a P, PI or proportional-integral-derivative (PID) controller, or other conventional feedback, feed forward or model based controller. Thus, a primary predictive controller can be used to operate on a long time horizon (e.g. corresponding to the timescale to circulate fluid around the entire well, or a specific event such as exit of substantially all of a gas phase from a wellbore of the managed pressure drilling system), but a secondary non-predictive controller can be used to operate on a shorter time scale (e.g. less than one second or less than the acoustic travel time round the well), to control events such as choke closure and pump shut off of the managed pressure drilling system.

Operation parameters for the managed pressure drilling system may be determined by processing the fast system interpretation model to determine the operation parameters producing desired or optimal wellbore pressures over the coming time horizon. For example, this processing may be performed by the or each predictive controller (and optionally by the or each additional controller, if used). For the or each predictive controller, the operation parameters may be determined by minimizing an objective function with constraints. In some aspects, the operation parameters may comprise at least one of a choke pressure and a gas injection rate.

In one aspect, the method may comprise: applying the determined operation parameters for a current time step to control the managed pressure drilling system. The procedures may then be repeated for subsequent time steps. More particularly, the receiving of the measurements in real-time, the use of the measurements to calibrate the fast system interpretation model, the use of the or each predictive controller to run the calibrated fast system interpretation model (and optionally the use of the or each additional controller), and the application of the determined operation parameters for a current time step may be repeated at subsequent time steps to control the managed pressure drilling system.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

Figure 1:
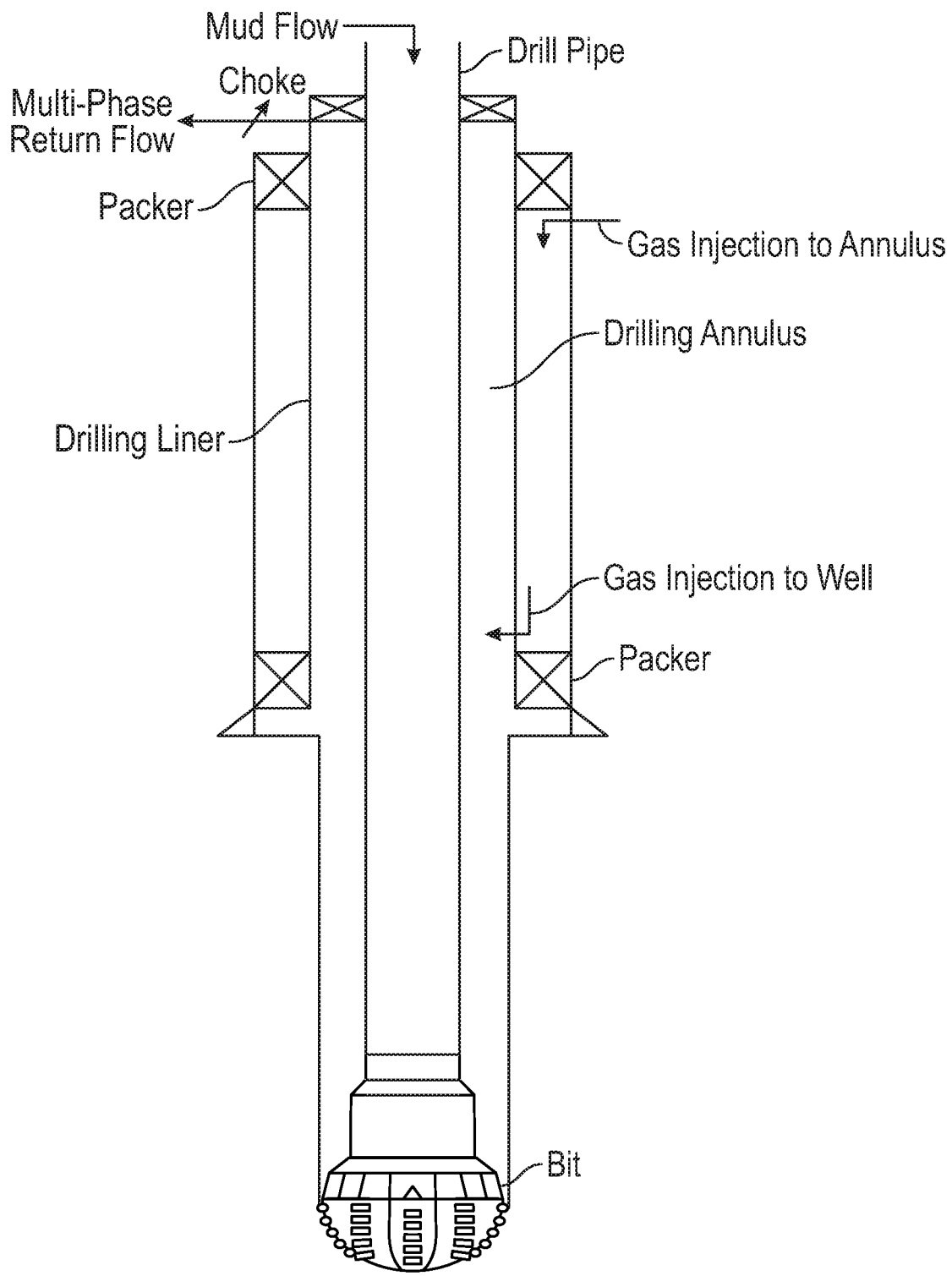
FIG. 1 shows a managed pressure drilling system using gas injection.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION

The ensuing description provides some embodiment(s) of the invention, and is not intended to limit the scope, applicability or configuration of the invention or inventions. Various changes may be made in the function and arrangement of elements without departing from the scope of the invention as set forth herein. Some embodiments maybe practiced without all the specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Some embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure and may start or end at any step or block. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 2:
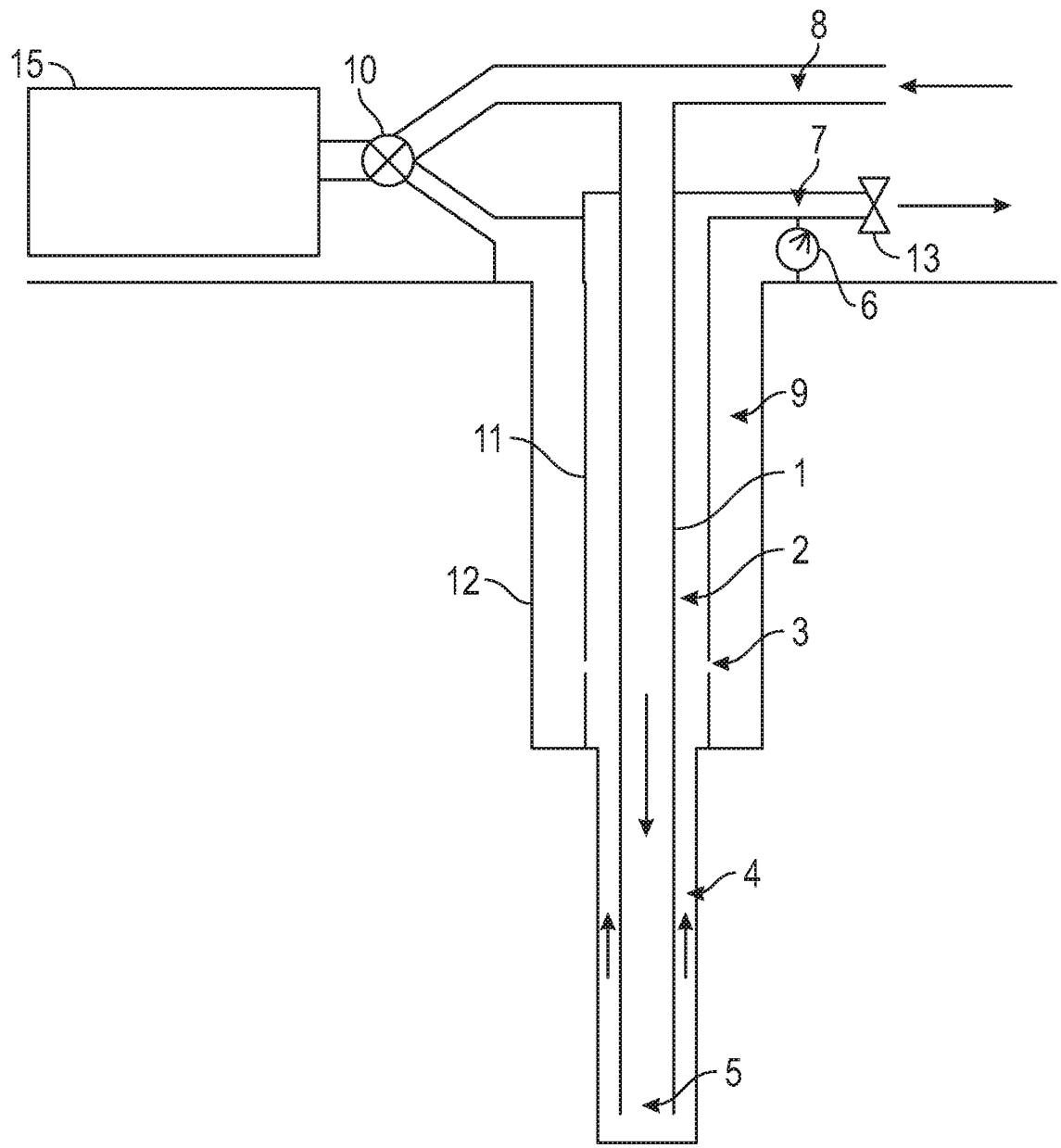
FIG. 2 illustrates a drilling system with a secondary/outer annulus before gas injection.

FIG. 2 illustrates the situation in a drilling system with a secondary/outer annulus before gas injection. As depicted, a drillstring 1 is suspended in a borehole 4 (for purposes of this application the terms wellbore, borehole and well may be used interchangeable). In the upper section of the borehole 4 there is an inner annulus 2 (also referred to as a drilling annulus) and a first casing string 11 that is hydraulically connected/in fluid communication with an outer annulus 9 through one or more orifices 3. The outer annulus 9 may itself be cased/lined by a second casing string 12.

The depicted concentric casing injection system may be used to inject gas into the borehole 4 that is being drilled through a subterranean formation. The concentric casing injection system comprises the outer annulus 9, which may also be referred to as a gas injection annulus, that surrounds the inner annulus 2, which may also be referred to as a drilling annulus, which drilling annulus is formed between the drillstring 1 disposed in the borehole and the first casing string 11 lining the borehole.

The gas injection annulus may comprise an annulus between the first casing string 11 the second casing string 12, which may be disposed concentrically around the first casing string 11. For example, gas may be pumped into the outer annulus 9 and through one or more gas injection ports 6 into the inner annulus 2. During, gas injection procedures, the concentric casing injection system may become/be unstable because of among other things the combination of the large volume and compliance of the gas in the outer annulus 9 along with the history dependent hydrostatic head of the inner annulus 2.

During conventional gas injection processes, oscillations in BHP of up to 2000 psi (14 MPa) with a period of more than two hours have been recorded. The concentric casing injection system can be damped to prevent such large and/or long-duration oscillations by reducing the size/area of the one or more gas injection ports 6. However, restricting the size of the one or more gas injection ports 6 can make it almost impossible for the gas injection system to displace mud out of the outer annulus 9 and so gas injection into the inner annulus 2 may be prevented and/or restricted; for example it may take injection of large amounts of gas into the outer annulus 9 to displace the mud in the outer annulus 9 through small gas injection ports and this may lead to creating large pressure oscillations in the drilling system, which may require suspension of the drilling procedure.

In MPD, drilling fluid (also referred to herein as drilling mud or mud) may be pumped from a pump(s) (not shown) through pipework 8 into the drill string 1, down which it passes until it exits at a distal end 5, through a drill bit (not shown) or the like, before returning via the inner annulus 2 and return pipework 7 to fluid tanks for handling/preparing the drilling fluid. Between the pipework 7 and the fluid tanks (not shown) there may be chokes 13 and separators (not shown).

The outer annulus 9 and the pipes feeding the top of the drillstring are connected to gas pumps 15, via a valve manifold 10, which may direct gas either to the drillstring feed, to the outer annulus 9 or optionally to both at once. Measurement of the pressure and other measurements may be made in the outer annulus 9, the inner annulus 2, the drillstring 1 and/or the like. In addition to the described equipment, there may be many other pieces of equipment at the surface, such as blow-out-preventers, a rotating-control-head etc., which are normal with MPD, but which may not be involved in the procedure detailed here, and hence for clarity not shown.

The MPD system may comprise one or more flow ports (not shown) between the outer annulus 9 and the inner annulus 2. The one or more flow ports may allow drilling mud to flow between the inner annulus 2 and the outer annulus 9. For example, during the drilling process mud may be flowing in the inner annulus 2 and may flow through the one or more flow ports into the outer annulus 9. The one or more gas injection ports 6 may be smaller than the one or more flow ports.

Injection of gas into the drilling mud in the borehole serves to lower the hydrostatic head of the drilling mud and, in turn, lower the BHP. As such, by controlling the flow of gas into the drilling mud, the BHP can be controlled during the drilling procedure. In theory, the use of gas to control BHP is relatively simple. However, in practice, the borehole may be several thousand feet or meters long, and as such the gas is being injected into a column of drilling fluid that is itself of the orders of thousands of feet/meters. In MPD operations, the pumping of gas at rates sufficient for injection of a required volume of gas into the borehole to control the BHP may cause the drilling fluid to oscillate in the borehole producing large fluctuations in well pressure. When these oscillations are occurring, the drilling procedure has to be halted until the drilling fluid resumes a steady-state in the borehole, which may take hours of unproductive time. In the worst case scenario, the injection of gas may cause u-tubing, where sections/slugs of gas and drilling fluid may undergo wild oscillations within the borehole.

The BHP in a gas injection MPD procedure (often referred to as multiphase MPD) may be controlled using feedback from the state of the MPD procedure. By controlling/managing the BHP on an essentially continuous basis during the MPD procedure the need for injection of large volumes of gas in short periods of time may be prevented/reduced and the large perturbations to/oscillations of the drilling fluid in the borehole may be prevented/reduced. The window for the BHP may be calculated based on the presence of an amount of gas in the drilling fluid, in this manner gas may be continuously pumped into the borehole during the MPD procedure avoiding the need to initiate gas injection.

Additionally or alternatively, feedback from the MPD procedure may be used to control the gas injection and, as a result, control the BHP.

As noted previously, the drilled borehole may be thousands of feet/meters in length and, during the MPD procedure, drilling fluid is continuously pumped down the drillstring and back up through the drilling annulus. The BHP may be measured by one or more pressure sensors on the bottomhole assembly ("BHA") or on the drillstring. Measurements from such sensors may be communicated to the surface using wired drillpipe and/or mud pulse telemetry. Complications with mud pulse telemetry are the time it takes for the data to be transmitted to the surface, preventing/reducing effectiveness of active control, and the fact that mud pulse telemetry is not possible when the drilling fluid in the borehole is u-tubing.

Surprisingly, given the length of the borehole, it has been found that stand pipe pressure, the pressure of the drilling fluid at the surface, often thousands of meters/feet from the BHP location can be used to derive/estimate the BHP for a feedback control process.

The BHP may be essentially continuously determined using either pressure sensors on the BHA/drillstring and/or stand pipe pressure measurements. When the BHP is found to be outside of a desired pressure zone, gas may be injected in to the drilling annulus. The amount of gas and/or gas flow rate may be calculated from the measured BHP. In this way, gas flow rates can be set such that the gas flow will reduce the BHP.

For example, a processor or the like may be used to control one or more of the parameters. Sensors such as pressure and/or flow rate sensors may be used to monitor the flow of gas out of a compressor and/or into the drilling annulus. The flow rate of gas into the drilling annulus to produce the desired BHP may be calculated from a steady-state-model or the like. The actual flow of the gas out of the compressor and/or into the drilling annulus and/or a measured BHP after gas injection has commenced may be used to evaluate/update this model and as a result calculate necessary changes to the injection flow rate.

The feedback measurements of BHP during gas injection and/or gas flow of the injected gas during gas injection may be used to control operation of pressure control devices. For example, the feedback measurements may be used to control the surface choke. In this way, an integrated system can be provided for BHP management where the surface choke is operated in combination with gas injection to control the BHP without producing large oscillation in the drilling fluid. For example, contrary to expectations, it may be desirable to at least partially apply the surface choke during gas injection in order to lessen oscillations produced by the gas injection.

The pump rate of the surface pumps pumping the drilling fluid into the drillstring during the MPD may be modulated based upon the BHP measurements and/or the feedback measurements. Modulating the pump rate to maintain a gas fraction at the gas injection point has been found to reduce drilling fluid oscillations.

In a multi-phase MPD procedure, i.e., one where gas is pumped into the drilling fluid to manage BHP, the system is dependent on the volume and spatial distribution of the individual phases. Therefore, to monitor or control the pressure at specific locations in the MPD system, the fluids in the system can be measured and their distribution determined so that a prediction as to how the distribution will evolve in the period over which the system pressures is to be managed can be processed.

The gas injection, the mud pump, the surface choke and/or the fluid(s) injected into the borehole have an influence over the pressures in the MPD system up until the injected fluid has been circulated out of the borehole, and each of these variables may be controlled to manage/predict the MPD operation.

Model Predictive Control ("MPC") also known as Model Based Predictive Control or Predictive Control, may be used to manage/control the MPD procedure. In predictive control, a model of the system is run faster than real time to predict the implications of a specific sequence(s) of control action(s). By using appropriate optimization techniques, the most effective control actions to achieve the control objective may be processed. Furthermore, a multitude of models may be used to further optimize control action for particular conditions (states) of the circulation system, for example such conditions may comprise drilling system conditions such as: start pumping, stop pumping, making connection. Predictive control typically comprises an explicit internal model of the system, a receding time horizon, and computation of a control signal by optimizing predicted system behaviour. Predictive control is described, for example, in J. M Maciejowski, *Predictive Control with Constraints*, Prentice Hall (an imprint of Pearson Education), Harlow, England, 2002, ISBN 0 201 39823 0 PPR, which is hereby incorporated by reference.

In Multi-Phase MPD, a lighter gas phase or the like is mixed with the drilling fluid/mud to reduce the density of the mixed gas/mud column and reduce the bottomhole pressure. In Multi-Phase MPD, the column of multi-phase mixture flowing in the annulus is controlled at the surface with a choke, which may be used to choke the outflow of the multiphase mixture from the annulus. In Multi-Phase MPD, the gas is either injected into the mud/drilling fluid at the top of the drillpipe (Drill Pipe Injection) or through an additional line (Sacrificial line or Concentric Casing) close to the bottom of the annulus. The following description focuses on the Drill Pipe Injection technique, but the described control systems are appropriate to all of the different gas injection methods.

When the drilling system is in a stable steady state condition, maintaining the steady state condition is relatively straight forward. However, transitioning from one steady state to another steady state without large uncontrolled transients is a very complex process. Intrinsic to the drilling process are transient events, such as connections and drilling start-up, when the flow of fluids into the borehole may be stopped. During the connection transients, the injected gas will continue to migrate upwards in the borehole/drilling annulus past the heavier drilling fluid/mud perturbing the distribution of phases in the system.

Figure 3:
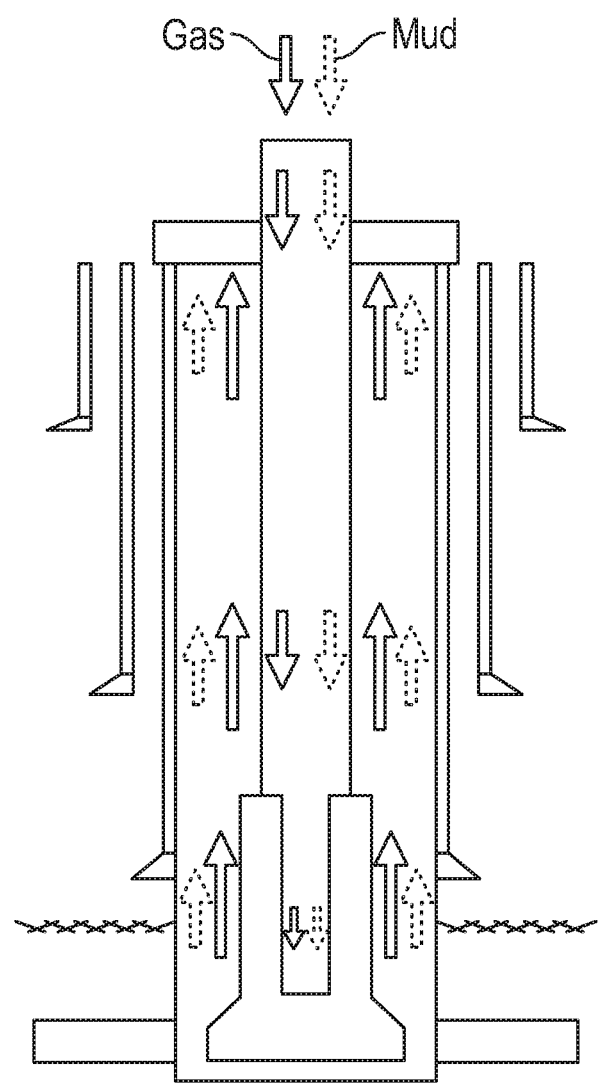
FIG. 3 shows a schematic of a wellbore with multi-phase flow while drilling, respective arrows indicating gas and mud flows.
Figure 4:
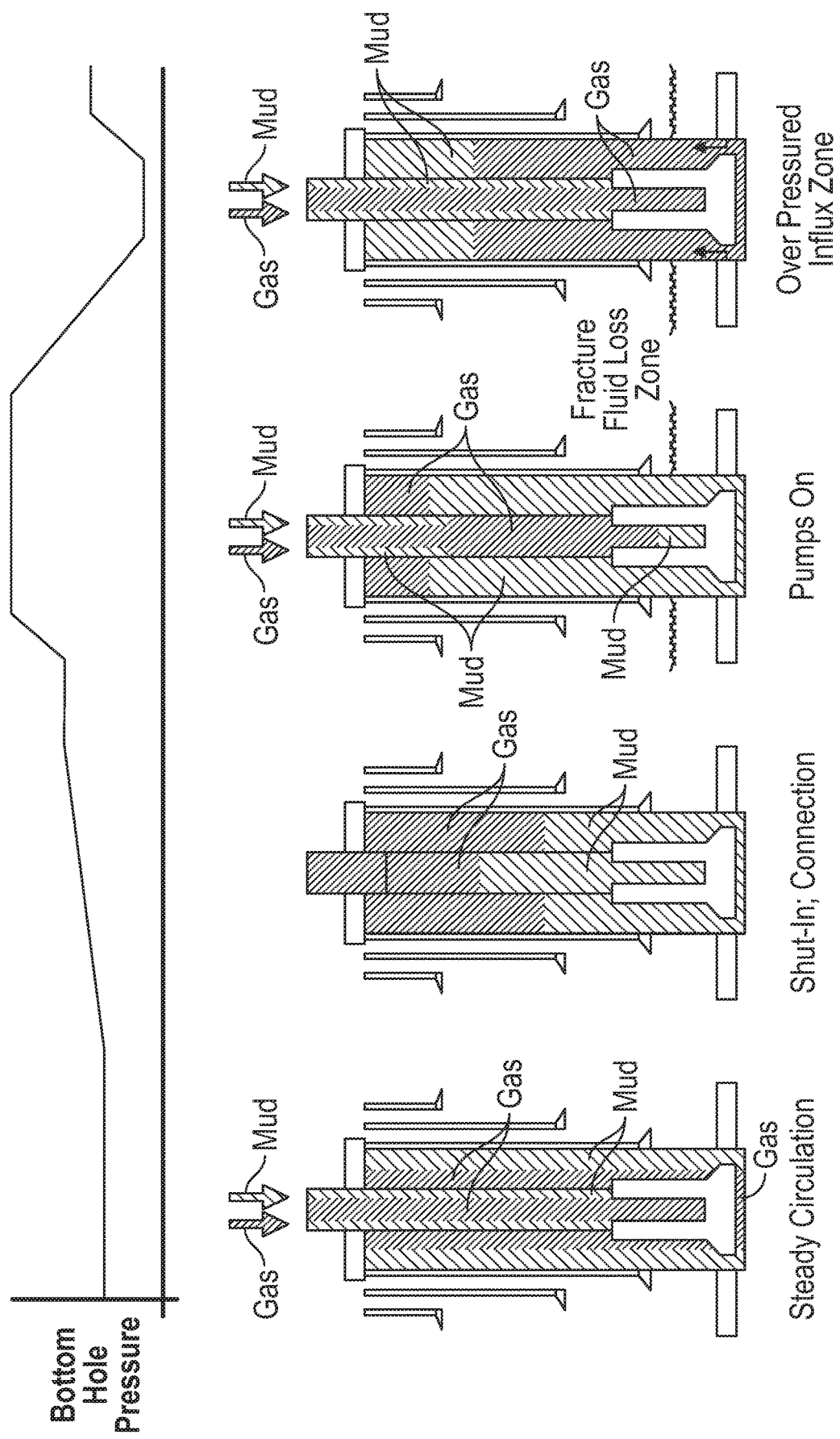
FIG. 4 illustrates, by way of a sequence of images of the wellbore of FIG. 3, the effect of stopping flow to make a regular connection during a multi-phase MPD operation, the bottom hole pressure being illustrated for the stages of the process in a corresponding plot of bottom hole pressure against time.

FIG. 3 shows a schematic of a wellbore with Multi-Phase flow while drilling, respective arrows indicating gas and mud flows, and FIG. 4 illustrates the effect of stopping flow to make a regular connection during a multi-phase MPD operation, where:

Initially the well is stable with a multi-phase flow being pumped round the system.

Flow is stopped to make a connection and the choke is closed. During this time the gas continues to migrate up the annulus and moves backwards up the drillpipe resulting in a gas pocket forming in the top of the annulus and drill pipe with a liquid column in the bottom of the borehole. As a result of the gas migration in the closed system the system pressure increases slowly.

To break the pipe and make a connection, the pressure at the top of the stand pipe must be vented to atmospheric pressure. Venting gas from the entire volume of the drill string will take a long time, so the volume to be vented is reduced by installing non return valves in the string at various points. Only the volume down to the top valve will need to be vented. Typically a valve is installed in the string when the bit is close to the depth of the casing shoe. When the fluid above the valve is vented the expanding gas will displace much of the mud from that section. As a result a gas pocket will be formed above the valve in addition to the gas pocket below the valve caused by gas migration.

When the flow is re-started the gas cap in the top of the annulus is circulated out as the liquid slug is pumped in from the bottom. This results in a large hydrostatic pressure (difference) increase between the bottom hole pressure and choke pressure.

In the drill pipe the gas cap forms a Taylor bubble and as stand pipe pressure is increasing this Taylor bubble gets compressed and is either dissolved in the mud at high pressure or circulated through the drill bit. If the pressure drop over the bit is considerable the gas expands when exiting the drill string out into the annulus. This causes pressure spikes in the annulus.

When the gas from the top of the drill pipe is circulated into the annulus the hydrostatic pressure difference over the annulus is reduced.

Figure 5:
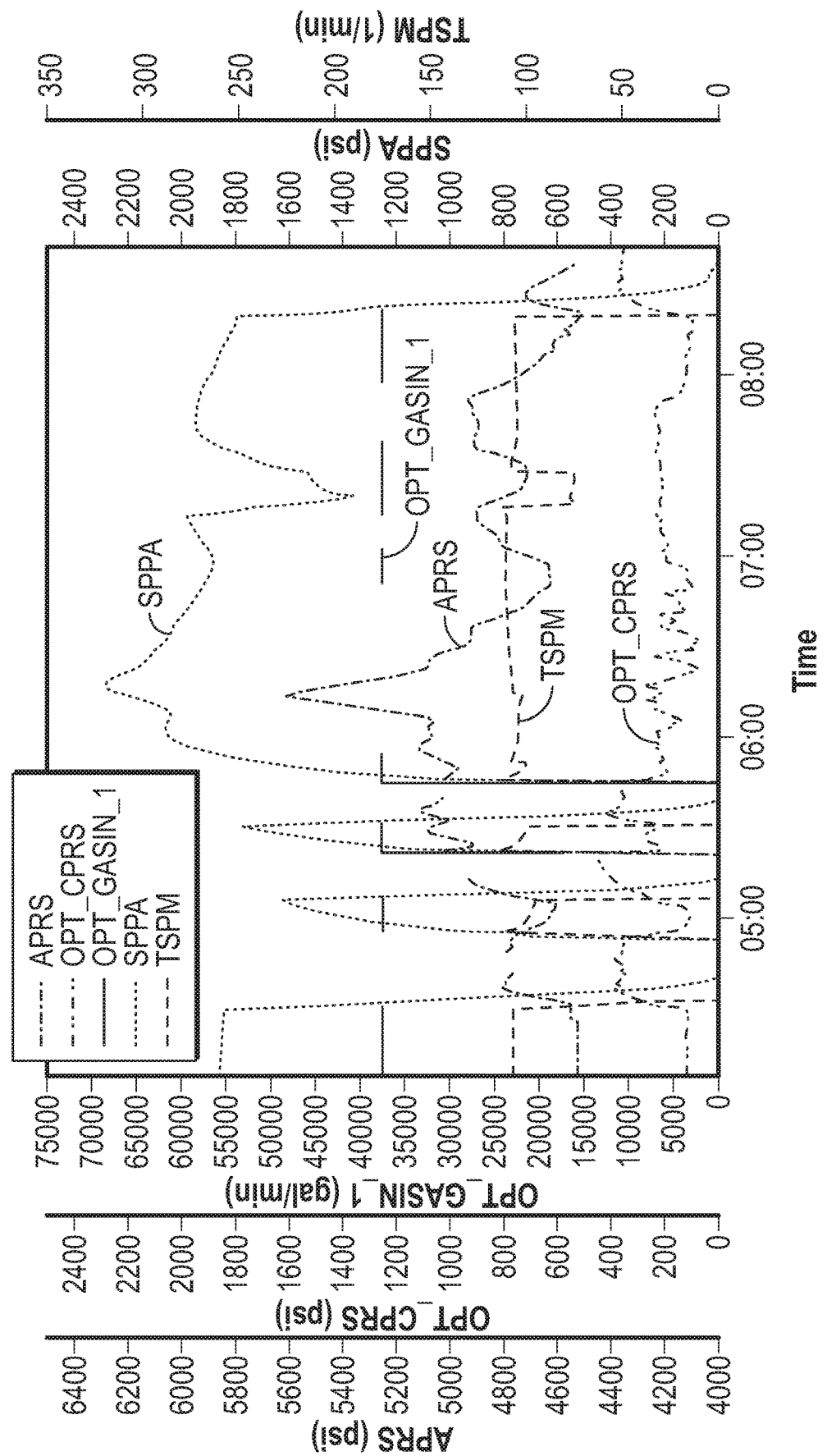
FIG. 5 shows data recorded from an MPD operation using wired drill pipe.

FIG. 5 shows the following data recorded from an MPD operation using wired drill pipe:

APRS—bottom hole annular pressure,
OPT_CPRS—choke pressure (surface),
OPT_GASIN_1—gas compressor flow rate (gaps in the data caused by signal drop out due to faulty instrumentation),
SPPA—stand pipe, pump pressure, and
TSPM—total strokes of pump, i.e. a measure of drilling mud flow rate.

With Drill Pipe Gas Injection into an 18,000 foot (5,500 m) well/borehole, the flow of fluids in the borehole/drill pipe was stable at the time 04:30. Pumping was cycled to make three connections and run back to bottom to start drilling. Drilling started at about 05:50. As a result of the gas cloud being vented at surface and the liquid puddle at the bottom of the well a (bottom hole) pressure spike occurs at about 06:05. Despite the choke pressure (OPT_CPRS) being almost unchanged, the bottomhole pressure (APRS) peaks at 5600 psi (39 MPa), up from 4500 psi (31 MPa) prior to stopping the pumps.

In the MPD process, the only controls that the operator has over this system are the choke position (or pressure), and the injection gas and drilling fluid injection rates. So in order to control the wellbore/borehole pressures, it is necessary to have a good knowledge of the distribution of the phases in the system as well as being able to predict how the distribution of these fluids will evolve in the future.

In one embodiment of the present disclosure, an MPD control system is provided comprising three elements:
1. An interpretation system
2. A predictive controller
3. A fast system model 1. Interpretation System A hydraulics model can have parameters that are unknown or uncertain. For example, in drilling there may be uncertainties with respect to the density of the rock cuttings or the exact mud/drilling fluid rheology. The interpretation system can infer these uncertain parameters using real-time measurements and this inferencing can be considered as "calibrating" the model on-line.

The uncertainty associated with the unknown parameters of the MPD process can be used with real-time measurements or the like to compute the uncertainty of the pressures, distribution of the phases and other outputs of the model for the MPC system. The uncertainties may be used to process an interpretation of the MPD system/calibrated model of the MPD system.

2. Predictive Controller

In aspects of the present invention, the predictive controller may provide a framework in which the calibrated model is run to some time horizon in the future. This time horizon can be fixed, or the prediction may stop when a particular event has been predicted, such as, merely by way of example, all gas exiting the wellbore. In general, the time horizon recedes as current time progresses. That is, the time horizon is fixed relative to the current time.

Figure 6:
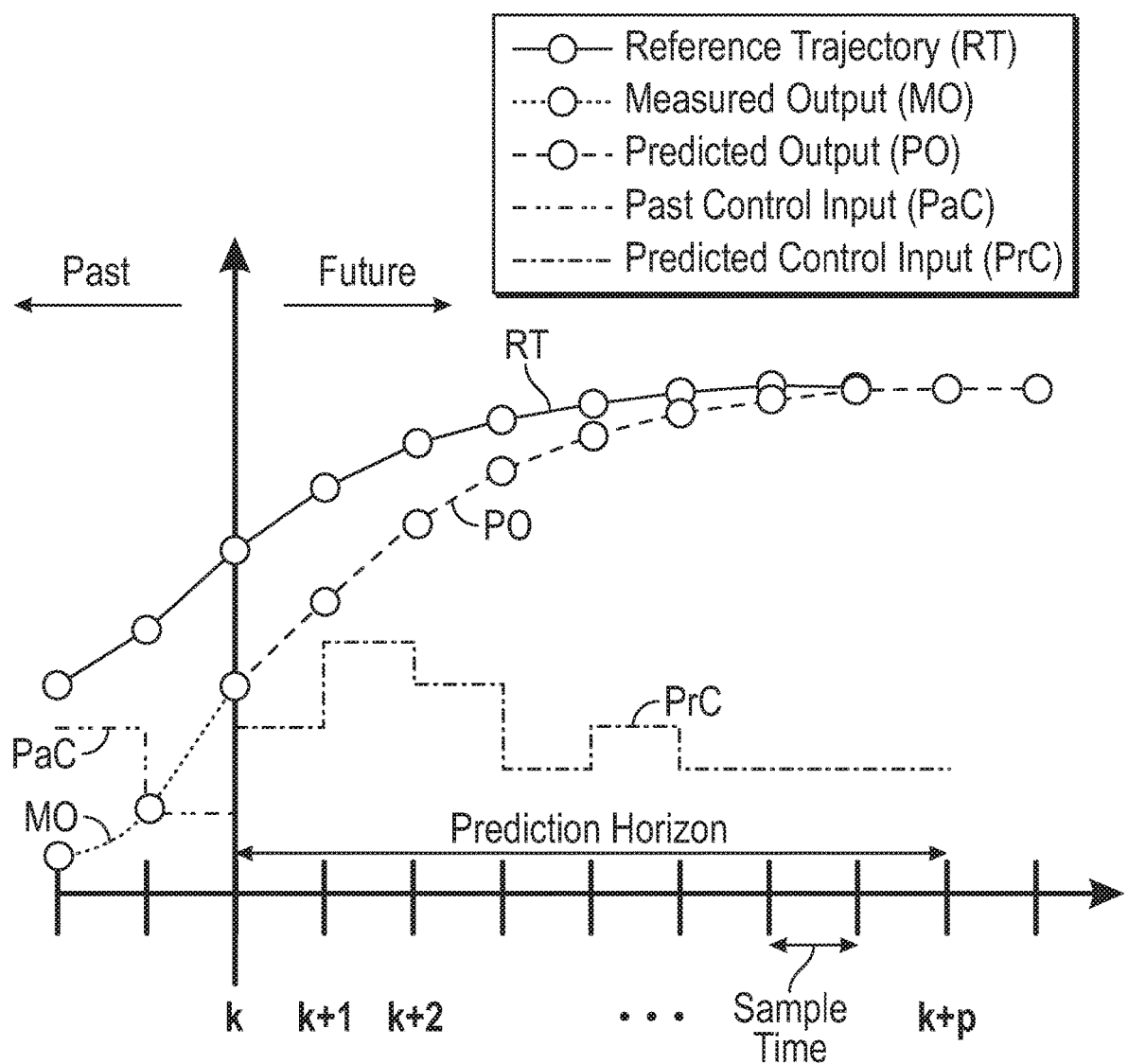
FIG. 6 illustrates schematically predictive control, the predicted control input being found that generates an ideal predicted output.

Different objectives can be put on the predictive controller. For example, the predictive controller can be used for generating alarms or warnings when running the calibrated model to a future time horizon produces a prediction that the MPD system, as being operated, will produce an adverse occurrence. The predictive controller can be used to determine appropriate choke pressures and gas injection rates to optimize the wellbore pressures over the coming time horizon. Determination of appropriate operating variables may be found by minimizing some objective function with constraints, as illustrated schematically in FIG. 6, k being the current time, and the time horizon extending into the future to the k+pth time step. When the first element of the predicted control input (PrC) is applied as an input signal to the MPD system, the whole cycle of output measurement (MO), prediction (PO) and input trajectory (i.e. predicted control input (PrC)) can be repeated.

The calibrated models may be used in conjunction with other optimization systems associated with the drilling process, for example, a system that is controlling rate of penetration ("ROP") of the drilling system or the output power of a drilling motor. For example, running the hydraulics models forward in time can provide a maximum ROP constraint curve for the ROP controller since the ROP is affected by drilling fluid dynamics/properties. Another mechanism for incorporating the MPD models with other optimization systems is to create a combined global optimization function and use predictive control techniques to minimize this objective function to some time horizon in the future. In MPD applications, the time horizon may be long and the uncertainty of the model outputs (pressures and phase distributions) may need to be considered at times far into the future.

Two or more predictive controller can be operated simultaneously but over respective and different time horizons. For example, a primary predictive controller can operate on a long time horizon, e.g. corresponding to the timescale (which may be greater than ten minutes, 30 minutes to 3 hours being typical) to circulate fluid around the entire well, or being the time to complete a long timescale event, such as exit of substantially all of a gas phase from a wellbore being drilled by the MPD system. A secondary predictive controller can then operate on a much shorter time horizon, e.g. less than the acoustic travel time round the well or less than one second, to control events such as choke closure and pump shut off with a much higher resolution.

Another option is to have two or more simultaneously operating controllers, one or some of which are predictive controllers, and one or some of which are not of predictive controller type. For example, a primary predictive controller can again operate on a long time horizon, but a secondary controller, which is not a predictive controller, can operate on a shorter time scale. The non-predictive controller can be a P, PI or PID controller, or other conventional feedback, feed forward or model based controller.

3. Fast System Model

In embodiments of the present invention, both the Interpretation System and the Predictive Controller may require models that simulate multiple scenarios in real-time. Thus the model may be run in the region of 10 to 250 times faster than real-time. Moreover, the predictive controller may operate over several different time scales. These time scales may include a long time scale of the order of a complete circulation of the well. In MPD, the fluid that is pumped into the well at any particular time influences the wellbore pressure up until the time that the fluid is circulated out of the MPD system. As such operation of the MPD system may be predicted over this entire time scale. During these long time scales, the gas injection rate may be found to be an important control input. As well as the long time scale, there may be a short time scale (of the order of minutes or seconds), where the effect of changing the flux of injected gas in or out of the well can compress or de-compress the system, modulating the pressures in the system. A model can be used to account for this short time scale effect that provides for simulation of short interval effects. During these short, transient time scales, it has been found that the choke is generally an important control input.

Due to the use of multiple time scales, different models may be used for example for monitoring the MPD system in the short term and controlling the operation of the choke and monitoring the MPD system over the long term and controlling the injection/influx of gas. A single model that may be run at different resolutions or time-steps may be used. Model reduction techniques (e.g. using techniques described in A. C. Antoulas, *Approximation of Large-Scale Dynamical Systems* (*Advances in Design and Control*), Society for Industrial and Applied Mathematics; 1 edition (25 Jun. 2009), ISBN-13: 978-0898716580, which is hereby incorporated by reference) can be used to speed up a more complex model while sacrificing some pre-determined amount of resolution.

While the principles of the disclosure have been described above in connection with specific apparatuses and methods, it is to be clearly understood that this description is made only by way of example and not as limitation on the scope of the invention.

What is claimed is:

1. A method for controlling a managed pressure drilling system, comprising:
   providing a fast system interpretation model for the operation of the managed pressure drilling system;
   receiving in real-time measurements from one or more sensors, wherein the sensor measurements comprise measurements associated with operation of the managed pressure drilling system;
   using the measurements to calibrate the fast system interpretation model for the managed pressure drilling system in real-time;
   using a predictive controller to run the calibrated fast system interpretation model to a time horizon in the future;
   simultaneously using a plurality of controllers to run the calibrated fast system interpretation model to respective and different time horizons in the future; and
   controlling the circulation of fluids in the managed pressure drilling system with operation of a choke and a gas injection port based on the different time horizons of the calibrated fast system interpretation models.

2. The method of claim 1, wherein the fast system interpretation model is run/updates faster than real-time.

3. The method of claim 1, wherein the fast system interpretation model comprises a hydraulic model of the managed pressure drilling system.

4. The method of claim 1, wherein the step of using the measurements to calibrate the fast system interpretation model comprises comparing the measurements to one or more predicted parameters having an uncertainty and updating the fast system interpretation model based upon the comparison.

5. The method of claim 1, wherein the step of using the measurements to calibrate the fast system interpretation model for the managed pressure drilling system in real-time comprises using the real-time measurements in the fast system interpretation model to predict one or more uncertain parameters.

6. The method of claim 4, wherein the one or more uncertain parameters comprise at least one of a pressure of a gas phase in the managed pressure drilling system, a pressure of a liquid phase in the managed pressure drilling system, a pressure of a drilling fluid in the managed pressure drilling system, and a distribution of different phases in the managed pressure drilling system.

7. The method of claim 1, wherein the time horizon comprises one of a fixed time period and a temporal occurrence of a predicted event.

8. The method of claim 7, wherein the predicted event comprises exit of substantially all of a gas phase from a wellbore being drilled by the managed pressure drilling system.

9. The method of claim 1, further comprising:
   generating an alarm when the fast system interpretation model indicates occurrence of a detrimental event prior to the time horizon if operation of the managed pressure drilling system is continued without modification.

10. The method of claim 1, wherein at least one of the plurality of controllers is a predictive controller.

11. The method of claim 1, wherein using the predictive controller to run the calibrated fast system interpretation model to the time horizon in the future results in the predictive controller determining operation parameters for the managed pressure drilling system producing desired or optimal wellbore pressures over the time horizon.

12. The method of claim 11, wherein, for the predictive controller, the operation parameters are determined by minimizing an objective function with constraints.

13. The method of claim 11, wherein the operation parameters comprise at least one of a choke pressure and a gas injection rate.

14. The method of claim 11, further comprising:
   applying the determined operation parameters for a current time step to control the managed pressure drilling system.

15. The method of claim 14, wherein:
   the receiving of the measurements in real-time, the use of the measurements to calibrate the fast system interpretation model, the use of the predictive controller to run the calibrated fast system interpretation model, and the application of the determined operation parameters for a current time step are repeated at subsequent time steps to control the managed pressure drilling system.

16. A computer system for performing the method of claim 1.

17. A non-transient computer-readable medium storing computer program code which, when run on a computer, causes the computer to perform the method of claim 1.

18. The method of claim 1, wherein simultaneously using the plurality of controllers to run the calibrated fast system interpretation model includes determining a choke pressure and a gas injection flow rate that flatten pressure differentials in a wellbore, and wherein controlling the circulation of fluids in the managed pressure drilling system with operation of the choke and gas injection port includes using the determined choke pressure with the choke and the gas injection flow rate with the gas port.

19. The method of claim 18, wherein:
   the respective and different time horizons in the future include a first time scale that is seconds or minutes in length and a second time scale that is longer than the first time scale, and wherein the plurality of controllers determine that the choke pressure flattens pressure differentials in the wellbore over the first time scale and the gas injection flow rate flattens pressure differentials in the wellbore over the second time scale.

20. The method of claim 19, wherein the second time scale is on an order of complete circulation in the wellbore.

* * * * *